Patented June 1, 1926.

1,587,101

UNITED STATES PATENT OFFICE.

ADOLPH WOOLNER, JR., OF PEORIA, ILLINOIS.

PROCESS OF PRODUCING FERTILIZER AND CATTLE FEED.

No Drawing.   Application filed December 26, 1924.   Serial No. 758,316.

This invention pertains to a method of recovering solids from the spent residue of slop of butyl alcohol distillation for yielding valuable ingredients for use in producing fertilizing material and cattle feed, including the recovery of alcohol.

An object of the invention is to obtain solids such as starches, sugar, proteins, fats and salts from the very thin spent slop resulting from the distillation of butyl alcohol from grains or other starch making vegetable matter by adding such slop to a material of a very high specific gravity such as a sugar containing molasses, usually 40 to 41 Baumé, which, while reducing the gravity of the latter, raises the gravity of the former to the end that the named solids may be economically recovered together with the recovery of alcohol as an economic step, the mixed materials being rich in proteins and fats for the production of a fertilizer or a cattle feed.

A further object is that of salvaging an otherwise discarded but valuable content of the slop resulting from the process of distillation of butyl alcohol from starch substances and employing such slop for the reduction of the specific gravity of a material of very high specific gravity serving as the reducing medium for the latter in order that it may undergo treatment for its own solids and that it may be distilled for the recovery of alcohol, the combining of the two materials being directed to the recovery of the solids of the otherwise discarded slop.

Due to the excessive quantities of water required in the treatment of materials used in the manufacture of butyl alcohol, which is somewhere in the proportion of from sixty to seventy gallons of water to a bushel of fifty-six pounds of starch making materials, it is, of course, impractical to attempt the recovery of the solids in the residue or slop by ordinary known methods. The solids such as proteins, fats and salts which, while valuable for use in making fertilizers and feed cannot be recovered from the great bulk of liquid carrying them by reason of the prohibitive cost of so doing and they are therefore permitted to run to waste.

In view of the value of the solids and also from the fact that the butyl alcohol slop can be used as a yeast food for the production of alcohol from cane or beet molasses or other sugar containing materials it is my purpose to bring these two materials together for the stated purpose of creating a fertilizer or a cattle feed while recovering the alcohol from the mixture during the process.

In practicing my process I may use the residue or slop of butyl alcohol distillation in its original discarded state, or I may concentrate it to a certain extent, if I so desire, before combining the two materials.

The combined solutions are placed in a suitable container in about the proportion of ten gallons of the slop to one gallon of the molasses which, after thorough agitation to obtain a proper admixture, is sterilized by known methods to destroy yeast cells, the resulting mash being then cooled to converting temperature, adding thereto a malt or diastase for conversion of the starches into fermentable sugar.

After conversion and at any time before fermentation I preferably add to the mixture a sufficient amount of alkali to neutralize the acids in the butyl alcohol slop content to gain a more complete fermentation of the sugar, distiller's yeast being added in sufficient quantity for the production of alcohol.

After fermentation has taken place the mass is subjected to distillation in the customary way or ways to recover the alcohol.

The residue or slop remaining after distillation is of a much higher specific gravity than the original butyl alcohol slop, of course, and contains the solids of the latter, and of the molasses, and is in such form that the recovery of all of the solids from both can be readily and economically practiced. By settling the slop in the usual way the thin liquor may be drawn off, or, by subjecting the whole to filter pressing in the well known way filter cakes are produced, while the thin liquor may be run into vacuum pans for evaporation, the syrupy residue of which is combined with the filter cakes followed by finishing in feed driers. The dried material contains all of the salts and nitrogenous matter of the original slop of butyl alcohol manufacture together with the salts and other valuable materials of the molasses and constitute in conjunction with the grains themselves a valuable concentrated fertilizing material.

As an alternative method, the heavy materials of the separated slop may be placed in a steam tight vessel and subjected to steam pressure of from five to ten pounds, for example, for the purpose of placing the same in better condition for treatment in the filter presses. The filter cakes may now be dried without the addition of other matter, but in either treatment all of the solids obtained are used with the exception of the starches, of course, of the original butyl alcohol slop and which contain a high percentage of proteins and fats and contribute to a very excellent cattle feed.

The steps incident to the recovery of the alcohol from the combined materials is quite naturally taken advantage of since yielding a valuable commodity and reducing the cost of practicing the process of recovering the named solids.

Combining with a heavy substance such as the heavy molasses a distiller's slop too thin to be treated separately for its valuable solids is believed to be a new step in the art and particularly for the purposes set forth. That is to say, since a substance such as molasses is of a very high specific gravity, as commercially supplied, and must be treated to reduce its gravity in order to recover the solids therein, the addition thereto of a thin slop resulting from butyl alcohol distillation, extremely low in gravity, as the reducing agent provides the way for recovery of the valuable solids in both.

I claim:

1. In the process of producing materials from which to obtain a fertilizer and a cattle feed the process of combining with the very thin slop of butyl alcohol distillation a sugar containing material of a relatively high specific gravity for raising the gravity of said slop whereby to produce a mixture from which valuable substances in the original slop may be economically obtained in the production of said fertilizer and cattle feed.

2. In the process of producing materials from which to obtain a dried fertilizer and cattle feed the process of combining with the naturally very thin slop of butyl alcohol distillation a sugar containing material of a much higher specific gravity than that of said slop whereby to provide a mixture of said slop capable of treatment economically in obtaining said fertilizer and cattle feed.

3. The process of producing a fertilizer and a cattle feed which includes the process of combining slop of butyl alcohol distillation having a naturally very low specific gravity with a sugar containing material of a high specific gravity for raising the gravity of the said slop and reducing the gravity of the said sugar containing material whereby to produce a mixture from which valuable substances can be economically obtained in the production of said fertilizer and cattle feed.

4. In the process of producing a fertilizer and a cattle feed, the process which includes combining with slop of butyl alcohol distillation having a naturally very low specific gravity a molasses of a very high specific gravity whereby to increase the gravity of said slop and decrease the gravity of the molasses to provide a mixture of a gravity capable of economical treatment in the production of said fertilizer and cattle feed.

5. In the process of producing a fertilizer and cattle feed, the process which includes combining a low gravity waste slop of butyl alcohol distillation with a molasses of a high specific gravity for increasing the gravity of said slop and decreasing that of the molasses whereby to provide a mixture from which the solids of the original thin slop may be economically recovered.

6. In the process of producing a fertilizer and cattle feed, the process which includes combining a low gravity waste slop of butyl alcohol distillation with a molasses of high specific gravity, separating the thick and thin portions, and drying the thick portion.

7. The process of producing a fertilizer and a cattle feed which includes combining waste slop of butyl alcohol distillation with a molasses of high specific gravity, separating the thick and thin portions, evaporating the thin portion and combining the residue of evaporation with the thick portion.

8. The process of producing a fertilizer and cattle feed which includes combining waste slop of butyl alcohol distillation with a molasses of high specific gravity, separating the thick and thin portions of the mixture, evaporating the thin portion, combining the residue of evaporation with the thick portion, and drying the same.

9. In the process of recovering solids from the thin slop of butyl alcohol distillation for use in making a fertilizer and cattle feed, the process of combining the slop with a material of high specific gravity also containing solids, sterilizing the mixture, cooling, adding a malt or diastase, yeasting, fermenting and distilling to recover alcohol, separating the thick and thin portions of the resultant slop, evaporating the thin portion, adding the syrup of evaporation to the thick portion and drying the same.

10. In the process of recovering solids from the thin slop of butyl alcohol distillation for use in making a fertilizer and cattle feed, the process of combining the slop with a material of high specific gravity also containing solids for use in producing said fertilizer and cattle feed, sterilizing the mixture and cooling it, adding a malt or diastase, yeasting, fermenting and distilling to recover alcohol, separating the thick and thin portions of the resultant slop, subjecting the thick portions to steam pressure, and drying the same.

11. In the process of recovering solids from the thin slop of butyl alcohol distillations for use in making a fertilizer and cattle feed, the process of combining the slop with a molasses of high specific gravity also containing solids for use in producing said fertilizer and cattle feed, sterilizing the mixture and cooling it, adding a malt or diastase, yeasting, fermenting and distilling the same to recover the alcohol, and reducing the resultant slop to dryness.

12. In the process of recovering valuable substances from the slop of butyl alcohol distillation, the process of combining the slop with a material of high specific gravity containing recoverable substances, sterilizing the mixture, converting, cooling, yeasting, neutralizing, fermenting and distilling the same to recover alcohol therein, and reducing the resultant slop for drying.

13. In the process of producing a fertilizer and a cattle feed, the process which includes the steps of adding the thin waste slop of butyl alcohol distillation to a material of a relatively higher specific gravity to produce a workable mixture of both said materials, treating the mixture to produce fermentation, distilling the same to recover the alcohol, and drying the residue.

14. In the process of producing a fertilizer and cattle feed, the process which includes the steps of combining the thin waste slop of butyl alcohol distillation with a molasses of a much higher specific gravity than said slop, sterilizing the mixture, cooling the same, adding yeast thereto, and distilling the same.

15. In the process of producing a fertilizer and cattle feed, the process which includes the steps of combining the thin waste slop of butyl alcohol distillation with a material of a very high specific gravity to produce a workable mixture for both materials, fermenting and distilling the same for the recovery of alcohol, separating the thick from the thin portions of the resultant slop, subjecting the thick portions to steam pressure, eliminating the water from the same, and drying it.

In testimony whereof I affix my signature.

ADOLPH WOOLNER, Jr.